US012573193B2

(12) United States Patent
Grace et al.

(10) Patent No.: US 12,573,193 B2
(45) Date of Patent: Mar. 10, 2026

(54) SPATIAL MODE PROCESSING FOR HIGH-RESOLUTION IMAGING

(71) Applicant: Arizona Board of Regents on Behalf of the University of Arizona, Tucson, AZ (US)

(72) Inventors: Michael Grace, Tucson, AZ (US); Saikat Guha, Tucson, AZ (US); Mark Neifeld, Tucson, AZ (US); Amit Ashok, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 304 days.

(21) Appl. No.: 18/289,382

(22) PCT Filed: May 6, 2022

(86) PCT No.: PCT/US2022/027996
§ 371 (c)(1),
(2) Date: Nov. 3, 2023

(87) PCT Pub. No.: WO2022/240667
PCT Pub. Date: Nov. 17, 2022

(65) Prior Publication Data
US 2024/0242495 A1 Jul. 18, 2024

Related U.S. Application Data

(60) Provisional application No. 63/187,264, filed on May 11, 2021.

(51) Int. Cl.
*G06V 10/88* (2022.01)
*G06V 10/60* (2022.01)
*G06V 10/764* (2022.01)

(52) U.S. Cl.
CPC .............. *G06V 10/92* (2022.01); *G06V 10/60* (2022.01); *G06V 10/764* (2022.01)

(58) Field of Classification Search
CPC ....... G06V 10/92; G06V 10/60; G06V 10/764
See application file for complete search history.

(56) References Cited

U.S. PATENT DOCUMENTS

2005/0276443 A1 12/2005 Slamani et al.
2016/0097774 A1* 4/2016 Ashrafi ................ G01N 33/487
73/61.43
(Continued)

OTHER PUBLICATIONS

Redmon, J et al. "You Only Look Once: Unified, Real-Time Object Detection" . White Paper. [online], May 9, 2016; ArXiv; [Retrieved on Jul. 23, 2022]. Retrieved from the internet: <uri:https://arxiv.org/abs/1506.02640>; abstract; pp. 1-3.
(Continued)

*Primary Examiner* — Utpal D Shah
(74) *Attorney, Agent, or Firm* — Cozen O'Connor

(57) ABSTRACT

Optical imaging includes: configuring a spatial mode sorter to provide, in response to a received input optical signal, a separate output optical signal for each spatial mode in a set of target spatial modes: receiving a set of output optical signals from the spatial mode sorter during a detection interval of time: processing information based at least in part on the set of output optical signals received in the detection interval of time: and providing an estimated measurement for discriminating among a first set of two or more predetermined target images based at least in part on information derived from the processing. During the detection interval of time, a total number of the output optical signals is greater than two and less than ten.

22 Claims, 12 Drawing Sheets

(56) References Cited

U.S. PATENT DOCUMENTS

| | | | | |
|---|---|---|---|---|
| 2016/0198954 A1* | 7/2016 | Wang | .................. | A61B 5/0095 |
| | | | | 600/407 |
| 2019/0034800 A1 | 1/2019 | Shiratani | | |
| 2020/0027325 A1 | 1/2020 | Mori et al. | | |
| 2020/0119830 A1* | 4/2020 | Milione | .................. | G06F 18/24 |
| 2021/0033640 A1* | 2/2021 | Guha | .................... | G01Q 20/02 |
| 2021/0133512 A1* | 5/2021 | Milione | ................ | G06F 18/214 |
| 2024/0212095 A1* | 6/2024 | Maltese | ................ | G06T 3/4046 |

OTHER PUBLICATIONS

Defienne "Arbitrary spatial mode sorting in a multimode fiber" Web, pp. 1-8; Jun. 24, 2020 [retrieved Jul. 31, 2022]. Retrieved from the internet: URL: https://arxiv.org/pdf/2004.05585.pdf.

Fickler, R et al. "Custom-tailored spatial mode sorting by controlled random scattering" vol. 95, 161108. Phys. Rev. B. Online. Jan. 20, 2017; Entire Document; DOI: 10.1103/PhysRevB.95.161108.

Fontaine, N et al. "Laguerre-Guassian Mode Sorter" vol. 10. Nature Communications. Online. Apr. 26, 2019; Entire Document; DOI: 10.1038/s41467-019-09840-4.

Dutton. "Attaining the quantum limit of super resolution in imaging an object's lenth via pre-detection spatial mode sorting" Web; pp. 1-8; Jan. 19, 2018 [retrieved Jul. 31, 2022]. Retrieved from the internet: URL: https://arxiv.org/abs/1801.06602.

Z. Huang et al., "Quantum Hypothesis Testing for Exoplanet Detection", Phys. Rev. Lett., vol. 127, Iss. 13, pp. 1-6, Sep. 23, 2021, DOI: 10.1103/PhysRevLett.127.130502.

F. Bao et al., "Quantum-accelerated imaging of N stars", Optics Letters, vol. 46, No. 13, pp. 1-12, May 4, 2021, DOI: 10.1364/ol. 430404.

M. R. Grace et al., "Approaching quantum-limited imaging resolution without prior knowledge of the object location," J. Opt. Soc. Am. A, vol. 37, No. 8, pp. 1288-1299, 2020, DOI: 10.1364/JOSAA. 392116.

X-M Lu et al., "Quantum-optimal detection of one-versus-two incoherent optical sources with arbitrary separation", npj Quantum Inf, vol. 4, Dec. 7, 2018, DOI: 10.1038/s41534-018-0114-y.

Almeida et al., "Discrimination and estimation of incoherent sources under misalignment", American Physical Society, Phys. Rev. A, vol. 103, Issue 2, pp. 1-15, Feb. 8, 2021, DOI: 10.1103/PhysRevA.103. 022406.

Boucher et al., "Spatial optical mode demultiplexing as a practical tool for optimal transverse distance estimation", Optical Society of America, vol. 7, No. 11, pp. 1621-1626, Nov. 18, 2020, DOI: 10.1364/OPTICA.404746.

Kerviche et al., "Fundamental limit of resolving two point sources limited by an arbitrary point spread function", arXiv, physics.optics, pp. 1-8, Jan. 18, 2017, DOI: 10.48550/arXiv.1701.04913.

Kodinariya et al., "Review on Determining of Cluster in K-means Clustering", International Journal of Advance Research in Computer Science and Management Studies, vol. 1, Issue 6, pp. 90-95, Nov. 2013, ISSN: 2321-7782.

Liu et al., "Quantum Fisher information matrix and multiparameter estimation", J. Phys. A: Math. Theor. 53 023001, pp. 1-69, Dec. 18, 2019, DOI 10.1088/1751-8121/ab5d4d.

Nair et al., "Interferometric superlocalization of two incoherent optical point sources", Opt. Express, vol. 24, No. 4, pp. 3684-3701, Feb. 12, 2016, DOI:10.1364/OE.24.003684.

Paúr et al., "Reading out Fisher information from the zeros of the point spread function", Opt. Lett., vol. 44, No. 12, pp. 3114-3117, Jun. 2019, Doi: 10.1364/OL.44.003114.

Pirandola et al., "Computable bounds for the discrimination of Gaussian states", Phys. Rev. A, vol. 78, pp. 1-8, Jul. 2008, DOI: 10.1103/PhysRevA.78.012331.

William Hadley Richardson, "Bayesian-Based Iterative Method of Image Restoration*", J. Opt. Soc. Am., vol. 62, No. 1, pp. 55-59, Jan. 1972, DOI: 10.1364/JOSA.62.000055.

Sajjad et al., "Attaining quantum limited precision of localizing an object in passive imaging", Phys. Rev. A, pp. 1-19, Mar. 10, 2021, DOI: 10.1103/PhysRevA.104.022410.

Mankei Tsang, "Subdiffraction incoherent optical imaging via spatial-mode demultiplexing: Semiclassical treatment", Phys. Rev. A, pp. 1-20, Feb. 21, 2018, DOI: 10.1103/PhysRevA.97.023830.

Tsang et al., "Quantum Theory of Superresolution for Two Incoherent Optical Point Sources", Phys. Rev. X, vol. 6, Iss. 3, pp. 1-17, Aug. 29, 2016, DOI: 10.1103/PhysRevX.6.031033.

Zhang et al., "Super-resolution optical classifier with high photon efficiency", Opt. Lett., vol. 45, No. 18, pp. 4968-4971, Sep. 15, 2020, DOI: 10.1364/OL.401614.

* cited by examiner

900

Configure a spatial mode sorter

902

Receive output optical signals

904

Process information

906

Provide an estimated measurement

908

SPATIAL MODE PROCESSING FOR HIGH-RESOLUTION IMAGING

CROSS-REFERENCE TO RELATED APPLICATION(S)

This application claims priority to and the benefit of U.S. Provisional Application Patent Ser. No. 63/187,264, entitled "SPATIAL MODE PROCESSING FOR HIGH-RESOLUTION IMAGING," filed May 11, 2021, the entire disclosure of which is hereby incorporated by reference.

STATEMENT AS TO FEDERALLY SPONSORED RESEARCH

This invention was made with government support under Grant No. W911NF-20-1-0039 awarded by ARMY/ARO, and Grant No. HR0011-20-9-0128 awarded by DARPA. The government has certain rights in the invention.

TECHNICAL FIELD

This disclosure relates to spatial mode processing for high-resolution imaging.

BACKGROUND

Various techniques can be used to capture images of objects in an object plane. For example, a camera or other imaging device can be placed in a focal plane of a lens system in a direct imaging approach. In some situations (e.g., when there are features with extent smaller than the Rayleigh diffraction limit), the optical collection hardware used for direct imaging approaches may be insufficient to resolve the relevant object features, or may require a relatively long integration time for estimation tasks involving discriminating different classes of images.

SUMMARY

In one aspect, in general, a method for optical imaging includes: configuring a spatial mode sorter to provide, in response to a received input optical signal, a separate output optical signal for each spatial mode in a set of target spatial modes; receiving a set of output optical signals from the spatial mode sorter during a detection interval of time; processing information based at least in part on the set of output optical signals received in the detection interval of time; and providing an estimated measurement for discriminating among a first set of two or more predetermined target images based at least in part on information derived from the processing. During the detection interval of time, a total number of the output optical signals is greater than two and less than ten.

Aspects can include one or more of the following features.

The method further includes: receiving a second set of output optical signals from the spatial mode sorter during a second detection interval of time; processing information based at least in part on the second set of output optical signals received in the second detection interval of time: and providing a second estimated measurement for discriminating among the first set of two or more predetermined target images based at least in part on information derived from the processing.

The method further includes: receiving a second set of output optical signals from the spatial mode sorter during a second detection interval of time: processing information based at least in part on the second set of output optical signals received in the second detection interval of time; and providing a second estimated measurement for discriminating among a second set of two or more predetermined target images based at least in part on information derived from the processing;

The processing includes: determining, based at least in part on the set of output optical signals, information that is dependent on a second moment of a transverse spatial distribution of the input optical signal; and performing a statistical analysis of the determined information based on a decision rule that provides a discrimination among the two or more predetermined target images.

The determined information further comprises information that is dependent on a first moment of a spatial distribution of the input optical signal.

The statistical analysis includes additional information obtained by prior measurement or prior estimation.

The decision rule comprises a comparison between the determined information and a set of second moments containing transverse spatial distributions of each of the predetermined target images.

The determined information is dependent on a third moment of a transverse spatial distribution of the input optical signal.

The decision rule comprises a comparison between the determined information and a set of third moments containing transverse spatial distributions of each of the predetermined target images.

The set of target spatial modes includes: a zero-order radially symmetric spatial mode, and two first-order spatial modes that represent transverse spatial distributions along orthogonal axes.

A subset of the set of target spatial modes are Hermite-Gaussian modes.

A subset of the set of target spatial modes are distorted Hermite-Gaussian modes.

A subset of the set of target spatial modes are matched to the spatial mode of a point spread function of an imaging system.

The set of target spatial modes is modified to compensate for misalignment of the spatial mode sorter with respect to the received input optical signal.

The set of target spatial modes is modified to compensate for optical aberrations distorting the received input optical signal.

The method further includes spatially aligning the spatial mode sorter to compensate for changes in a spatial or angular position of the received optical signal.

The two or more predetermined target images represent images of different types of vehicles.

The two or more predetermined target images represent images of different celestial bodies.

The two or more predetermined target images represent images of different biological structures.

The processing includes assigning classification labels to an input optical signal from a set of two or more predetermined classification labels.

In another aspect, in general, one or more non-transitory computer-readable media, having instructions stored thereon that, when executed by a computer system, cause the computer system to perform operations including: configuring a spatial mode sorter to provide, in response to a received input optical signal, a separate output optical signal for each spatial mode in a set of target spatial modes; receiving a set of output optical signals from the spatial mode sorter during a detection interval of time: processing information based at least in part on the set of output optical signals received in the detection interval of time; and providing an estimated measurement for discriminating among a first set of two or more predetermined target images based at least in part on information derived from the processing. During the detection interval of time, a total number of the output optical signals is greater than two and less than ten.

In another aspect, in general, an apparatus for imaging a distribution of one or more optical sources includes: a spatial mode sorter that is configurable based on a set of target spatial modes onto which an input optical signal is projected: and a control module. The control module is configured to: configure the spatial mode sorter to provide, in response to a received input optical signal, a separate output optical signal for each spatial mode in the set of target spatial modes: receive a set of output optical signals from the spatial mode sorter during a detection interval of time; process information based at least in part on the set of output optical signals received in the detection interval of time; and provide an estimated measurement for discriminating among a first set of two or more predetermined target images based at least in part on information derived from the processing. During the detection interval of time, a total number of the output optical signals is greater than two and less than ten.

Aspects can have one or more of the following advantages.

In implementations of some of the techniques described herein, optical receiver frameworks can classify known objects to a desired accuracy benchmark with substantially less integration time than that possible with an idealized focal-plane camera (e.g., direct imaging).

Some of the techniques described herein are performed in a binary object classification context, where optimal classification performance can be achieved for any two diffraction-limited objects using a spatial mode analyzer or spatial parity sorter. The systems can be used for 2D object classification. In some implementations, the system is able to achieve or approach the best classification accuracy allowed by physics and can reduce the integration time required for a desired accuracy by multiple orders of magnitude over direct imaging. Examples of applications of such systems include detection of exoplanets in extrasolar systems, and diagnosis of medical conditions based on binary fluorescence signaling in such cellular biostructures. These techniques can be utilized in high-stability contexts where I-dimensional or 2-dimensional visual codes or other objects are to be read or identified using small optics at large distances, for example. The techniques may be particularly advantageous in contexts where the use of RF or other active signaling is precluded, for example, in automated sensing contexts.

Other features and advantages will become apparent from the following description, and from the figures and claims.

BRIEF DESCRIPTION OF THE DRAWINGS

The disclosure is best understood from the following detailed description when read in conjunction with the accompanying drawing. It is emphasized that, according to common practice, the various features of the drawing are not to-scale. On the contrary, the dimensions of the various features are arbitrarily expanded or reduced for clarity.

DETAILED DESCRIPTION

Object discrimination is at the heart of decision making in medical diagnostics, extrasolar astronomy, and autonomous sensing. For incoherent imaging with large standoff distances, small objects, and/or aperture-limited imaging systems, the physical principle of diffraction impedes accurate discrimination between spatially distinct objects. A classic heuristic criterion, attributed to Rayleigh, holds that two objects cannot be discriminated when their distinguishing features exhibit length scales smaller than the width of the system point spread function. More quantitatively, for hypothesis tests between such "sub-Rayleigh" objects, the probability of correct identification degrades as the PSF more severely perturbs the measured images.

A paradigm shift for sub-Rayeigh imaging has emerged from the calculation of task-specific error bounds that optimize over all measurements permitted by quantum mechanics. These "quantum limits" revealed that direct measurements of the optical intensity profile are responsible for the catastrophic degree of error implied by the Rayleigh criterion, whereas alternative measurements yield far lower error than direct imaging for many tasks. Quantum limits, and "quantum-optimal" measurements that achieve them, were found for specific hypothesis tests including one-vs-two point source discrimination and exoplanet detection. However, no general results exist that broadly apply to real-world object discrimination settings.

Figure 1:
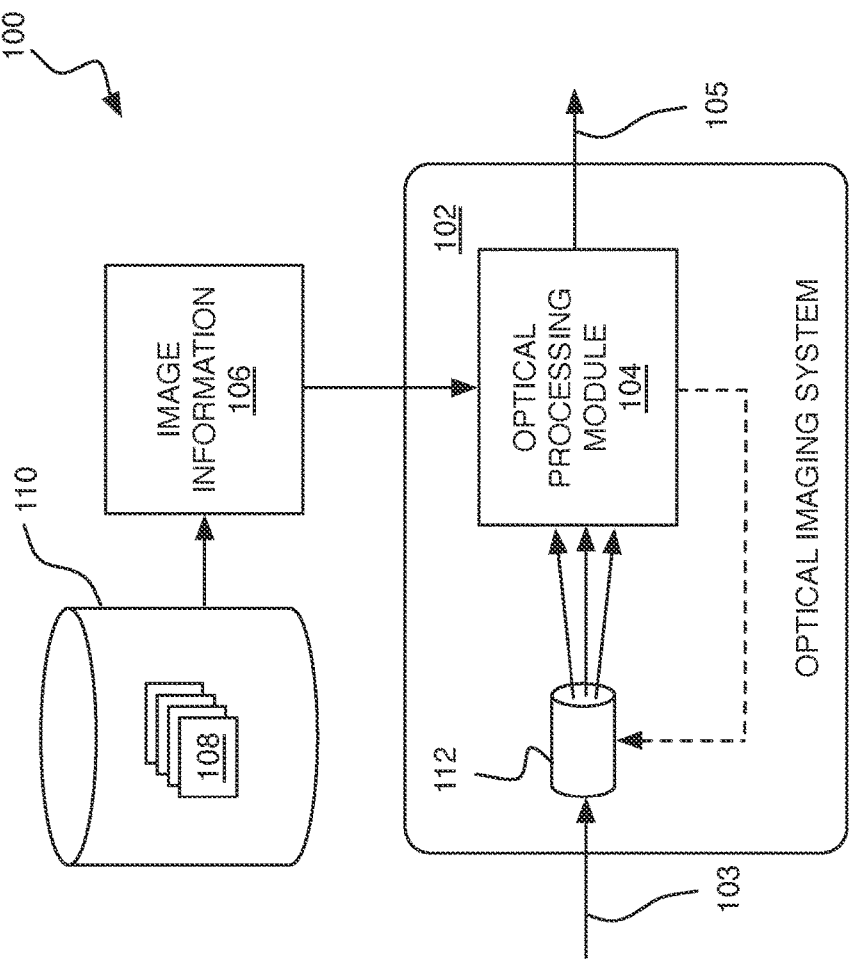
FIG. 1 is a schematic diagram of an example system for spatial mode processing.

Referring to FIG. 1, an example of a system 100 for spatial mode processing including an optical imaging system 102 that includes an optical processing module 104 (e.g., including an optical front-end and a processing module implemented on a special-purpose or general-purpose processor) for receiving an optical input 103 and producing measurement information 105 as output. The optical processing module 104 receives image information 106 to configure the optical imaging system 102 to discriminate among different images. For example, a set of predetermined target images 108 can be stored in a storage system 110. Between a series of detection intervals of time, the optical processing module 104 is, in some implementations, able to configure a configurable spatial mode sorter 112 to provide separate output optical signals for each spatial mode in a set of target spatial modes, as described in more detail herein. In some implementations, the spatial mode sorter 112 is initially configured and then used in a single detection interval to provide information for discriminating (e.g., for binary discrimination between two predetermined target images). Examples of some aspects of this part of the procedure (e.g., spatial-mode sorting) are described more detail below.

For hypothesis tests between any two incoherent, quasi-monochromatic 2D objects in the sub-Rayleigh regime, examples are described herein for techniques to 1) compute the quantum Chernoff bound on asymptotic discrimination error, 2) quantify the sub-optimal error rate of direct imaging, and 3) identify a quantum-optimal measurement whose linear-optical design does not depend on the object models. The results of prophetic examples included herein extend to M-ary discrimination: the same object-independent measurement is quantum-optimal for any database of M>2 objects.

Without intending to be bound by theory, for describing some examples, we let $H_j$, $j \in [1, M]$, denote a hypothesis corresponding to one of M candidate objects. Under $H_j$, the quantum state $\eta_j$ on Hilbert space $\mathcal{H}$ describes one temporal mode of the quasi-monochromatic optical field collected by an imaging system. Many naturally occurring incoherent sources exhibit a small mean photon flux $\varepsilon \ll 1$ per temporal mode such that multi-photon detection within the optical coherence time is vanishingly rare. In this case, a weak-source approximation uses the Fock expansion $\eta_j = (1-\varepsilon)|0\rangle\langle 0| + \varepsilon \rho_j + O(\varepsilon^2)$, where $|0\rangle\langle 0|$ is the quantum vacuum state and the single-photon state $\rho_j$ carries all of the spatial information about the object under $H_j$. Since $\rho_j$ is restricted to single-photon (unary) excitation, its infinite-dimensional spatial-mode structure can be mapped to a Hilbert space $\mathcal{H}^{(1)}$.

Let an imaging system with a 2D coherent PSF $\psi(\vec{x})$ relate object- and image-plane position vectors $\vec{x}_{obj} = \{x_{obj}, y_{obj}\}$ and $\vec{x} = \mu \vec{x}_{obj}$ by the transverse magnification $\mu$. We model the spatial irradiance of the object under $H_j$ by a normalized radiant exitance profile $m_j(\vec{x}_{obj})$. The state of the collected optical field on $\mathcal{H}^{(1)}$ is then $$\rho_j = \int\int_{-\infty}^{\infty} \frac{1}{\mu^2} m_j\left(\frac{\vec{x}}{\mu}\right)|\psi_{\vec{x}}\rangle\langle\psi_{\vec{x}}| d^2\vec{x}, \tag{1}$$

where the pure state $$|\Psi_{\vec{x}}\rangle = \int\int_{-\infty}^{\infty} \Psi(\vec{a} - \vec{x})|\vec{a}\rangle d^2\vec{a}$$

encodes the effect of the aperture and $|\vec{x}\rangle$ is a single-photon eigenket at image-plane position $\vec{x}$. In a basis of eigenvectors $$|\Phi_m\rangle = \int\int_{-\infty}^{\infty} \Phi_m(\vec{x})|\vec{x}\rangle d^2\vec{x} \text{ on } \mathcal{H}^{(1)}$$

set by orthogonal 2D functions $\phi_m(\vec{x})$, the density matrix $$\rho_j = \sum_{m,n=0}^{\infty} d_{j,m,n}|\phi_m\rangle\langle\phi_n| \tag{2}$$

has elements $d_{j,m,n} = \int\int_{-\infty}^{\infty} \mu^2 m_j(\vec{x}/\mu)c_{m,n}(\vec{x})d^2\vec{x}$, where $c_{m,n}(\vec{x}) = \langle\phi_m|\psi_{\vec{x}}\rangle\langle\psi_{\vec{x}}|\phi_n\rangle$.

Consider a binary hypothesis test between objects $m_1(\vec{x}_{obj})$ and $m_2(\vec{x}_{obj})$ with equal prior probabilities. To make a decision $Z \in [1,2]$, a receiver measures the state $\eta_1^{\otimes \mathcal{M}}$ or $\eta_2^{\otimes \mathcal{M}}$ acquired over $\mathcal{M}$ temporal modes and then applies a pre-determined decision rule on the outcome(s). If the conditional probability of deciding $H_{j'}$ under true hypothesis $H_j$ is $\mathbb{P}^{\mathcal{M}}(Z=j'|H_j)$, the average error probability $P_{err}^{\mathcal{M}} = [\mathbb{P}^{\mathcal{M}}(Z=1|H_2) + \mathbb{P}^{\mathcal{M}}(Z=2|H_1)]/2$ is a symmetric performance metric for the measurement/decision rule scheme.

Optimizing over all such schemes, the quantum-limited minimum average error $P_{err,min}^{\mathcal{M}} \sim e^{-\xi \mathcal{M}}$ follows an exponential decay when $\mathcal{M} \gg 1$, where the quantum Chernoff exponent (QCE) $\xi_Q$ quantifies how efficiently each additional copy of the received state $\eta_j$ suppresses the minimum error. We later show that the quantum limit can be written as $P_{err,min}^{\mathcal{M}} \sim e^{-\xi_Q^{(1)}N}$, where $N = \varepsilon M$ is the average photon number of $\eta_j^{\otimes \mathcal{M}}$ and where the per-photon QCE $$\xi_Q^{(1)} = \log\left[\min_{0 \leq s \leq 1} Tr\left(\rho_1^s \rho_2^{1-s}\right)\right] \tag{3}$$

obeys $\xi_Q \approx \varepsilon \xi_Q^{(1)}$ with weak-source sub-Rayleigh objects.

The most general description of a measurement, a positive operator-valued measure (POVM), consists of a set of positive semi-definite operators $\{\Pi_z\}_z$ on $\mathcal{H}$, linked to measurement outcomes $\{z\}$ on an outcome space $\mathcal{Z}$, that resolve the identity operator as $\sum_{z \in \mathcal{Z}} \Pi_z = I$. For a particular measurement performed on $\eta_j^{\otimes \mathcal{M}}$, the minimum average error probability among all decision rules goes as $P_{err,min,Meas}^{\mathcal{M}} \sim e^{-\xi_{Meas}\mathcal{M}}$, where $\xi_{Meas}$ is the Chernoff exponent (CE) for the chosen measurement. The quantum and classical statistics are related by the achievable quantum Chernoff bound $\xi_{Meas} \leq \xi_Q$; that is, the QCE automatically optimizes over the CEs of all POVMs on $\mathcal{H}^{\otimes \mathcal{M}}$. Under the weak-source approximation, we show that the minimal error of any measurement that uses temporally-resolved photon counting goes as $P_{err,min,Meas}^{\mathcal{M}} \sim e^{-\xi_{Meas}^{(1)}N}$, where $\xi_{Meas} \approx \varepsilon \xi_{Meas}^{(1)}$ in the sub-Rayleigh regime and where $$\xi_{Meas}^{(1)} = -\log\left[\min_{0 \leq s \leq 1} \sum_{z \in \mathcal{Z}^{(1)}} P(z|\rho_1)^s P(z|\rho_2)^{1-s}\right] \tag{4}$$

is the per-photon CE, which depends on probabilities $P(z|\rho_j) = Tr(\Pi_z^{(1)}\rho_j)$ of outcomes, in a single-photon sub-space $\mathcal{Z}^{(1)}$, of the reduced POVM $\{\Pi_z^{(1)}\}_{z \in \mathcal{Z}^{(1)}}$ on $\mathcal{H}^{(1)}$.

A measurement whose CE matches the QCE ($\xi_{Meas}^{(1)} = \xi_Q^{(1)}$) is considered to be quantum-optimal for the given hypothesis test. Conversely, a relative gap ($\xi_{Meas}^{(1)} < \xi_Q^{(1)}$) indicates a fundamental sub-optimality in the measurement that cannot be remedied by data post-processing.

Our goals are twofold: compute the QCE $\xi_Q^{(1)}$ for generalized sub-Rayleigh object discrimination and find a universally optimal measurement for which $\xi_{Meas}^{(1)} = \xi_Q^{(1)}$. As a first step, $m_2(\vec{x}_{obj})$ and if object $m_1(\vec{x}_{obj})$ is a single point source at position $\vec{x}_{1,obj}=\vec{x}_1/\mu$, we find that the QCE is exactly $$\xi_Q^{(1)} = -\log\left[\int\int\int_{-\infty}^{\infty} \frac{1}{\mu^2} m_2\left(\frac{\vec{x}-\vec{x}_1}{\mu}\right)|\Gamma(\vec{x})|^2 d^2\vec{x}\right], \qquad (5)$$

where $\Gamma(\vec{x})=\langle\psi_{\vec{x}}|\psi_{\vec{x}}\rangle$ is the 2D autocorrelation of the PSF and $\vec{\Omega}$ denotes the origin of the image-plane coordinate system. In this case, $\xi_{BSPADE}^{(1)}=\xi_Q^{(1)}$ is achieved by a 2D binary spatial mode demultiplexing (BSPADE) device that passively couples the PSF-matched spatial mode (i.e., $|\psi_{\vec{\Omega}}\rangle$) to one shot-noise-limited photon-counting detector and all other light to a second identical detector. As an example, for discriminating one-vs-two point sources with a 2D Gaussian PSF $\psi(\vec{x})=(2\pi\sigma^2)^{-1/2}\exp(-(x^2+y^2)/4\sigma^2)$, where d is the source separation under $H_2$, we confirm that the BSPADE CE enjoys a quadratic ($d^2$) scaling advantage as d≪σ over the CE of idealized 2D direct imaging (an infinite spatial bandwidth, unity fill factor, unity quantum efficiency photon-counting detector array).

We now generalize to arbitrary $m_1(\vec{x}_{obj})$ and $m_2(\vec{x}_{obj})$, with applications in bioimaging, astronomy, and computer vision. We focus on the sub-Rayleigh limit γ≪1, where $\gamma=\mu\theta/\sigma$ quantifies the geometric ratio between the magnified spatial extent of the object(s) θ and the PSF width σ.

We also define $\tilde{m}_j(\vec{x}_{obj})=\theta^2 m_j(\theta\vec{x}_{obj})$, $\tilde{\psi}(\vec{x})=\sigma\psi(\sigma\vec{x})$, and $\tilde{\Gamma}(\vec{x})=\Gamma(\sigma\vec{x})$ as non-dimensionalized representations of the object(s), the coherent PSF, and the PSF autocorrelation function, respectively, to isolate the influence of diffraction (i.e., γ) from that of the object and aperture. In some implementations, the objects' 2D centroids coincide at a location known to the receiver either from prior knowledge or a preliminary measurement, such that the task is object identification not localization, and that the PSF $\psi(\vec{x})$ is even in x and y, as with a circularly symmetric aperture.

To derive the generalized QCE, we represent $\rho_1$ and $\rho_2$ [Eq. (2)] in a basis of PSF-adapted (PAD) eigenvectors $|\phi_m\rangle=\int\int_{-\infty}^{\infty}\tilde{\phi}_m(\vec{x})|\vec{x}\rangle d^2\vec{x}$ on $\mathcal{H}^{(1)}$ via Gram-Schmidt orthogonalization of the 2D Cartesian derivatives of the non-dimensionalized PSF $\tilde{\psi}(\vec{x})$. For a 2D Gaussian PSF, the PAD basis functions $\tilde{\phi}_m(\vec{x})$ are Hermite-Gauss polynomials. After expanding $\rho_1$ and $\rho_2$ in powers of γ≪1 and truncating to finite dimensions, we use operator perturbation theory to find $$\xi_Q^{(1)} = \max_{0\leq s\leq 1}\left[\left(sm_{1,x^2}+(1-s)m_{2,x^2}-m_{1,x^2}^s m_{2,x^2}^{1-s}\right)\Gamma_{x^2} + \left(sm_{1,y^2}+(1-s)m_{2,y^2}-m_{1,y^2}^s m_{2,y^2}^{1-s}\right)\Gamma_{y^2}\right]\gamma^2 + O(\gamma^3), \qquad (6)$$

where $m_{j,x^ky^l}=\int\int_{-\infty}^{\infty}x_{obj}^k y_{obj}^l \tilde{m}_j(\vec{x}_{obj})d^2\vec{x}_{obj}$ are spatial moments of the non-dimensionalized object models and $\Gamma_{x^ky^l}=-[\text{Re}(\partial^{k+l}\tilde{\Gamma}(\vec{x})/\partial x^k\partial y^l)]_{\vec{x}=\vec{\Omega}}$ are derivatives of the PSF autocorrelation function. The QCE of Eq. (6) represents the quantum limit for discrimination between any two incoherent objects in the sub-Rayleigh limit.

The CE for direct imaging with a zeroless PSF that is separable in x and y is given by by $$\xi_{Direct}^{(1)} = (1/32)(\mathcal{K}_x + \mathcal{K}_y)\gamma^4 + O(\gamma^5), \qquad (7)$$

with $\mathcal{K}_a=(m_{1,a^2}-m_{2,a^2})^2\int\int_{-\infty}^{\infty}\psi_{a^2}(\vec{x})^2/|\tilde{\psi}(\vec{x})|^2 d^2\vec{x}$ for a∈[x, y] and where $\psi_{x^ky^l}(\vec{x})=\partial^{k+l}|\tilde{\psi}(\vec{x})|^2/\partial_x^k\partial_y^l$ are derivatives of the incoherent PSF. Eqs. (6) and (7) reveal a quadratic scaling sub-optimality in direct imaging—$\xi_{Direct}^{(1)}\sim\gamma^4$ vs $\xi_Q^{(1)}\sim\gamma^2$—for all binary discrimination tasks. Alternatively, a "TriSPADE" measurement sorts the collected light between the PSF-matched spatial mode and the first-order PAD-basis modes in two perpendicular dimensions, using only linear optics and photodetectors to implement a POVM $\Pi_0=|\tilde{\phi}_0\rangle\langle\tilde{\phi}_0|$, $\Pi_1=|\tilde{\phi}_1\rangle\langle\tilde{\phi}_1|$, and $\Pi_2=|\tilde{\phi}_2\rangle\langle\tilde{\phi}_2|$ that does not depend on the candidate object models. The resulting CE $\xi_{TriSPADE}^{(1)}$ achieves the QCE when γ≪1.

Figure 2:
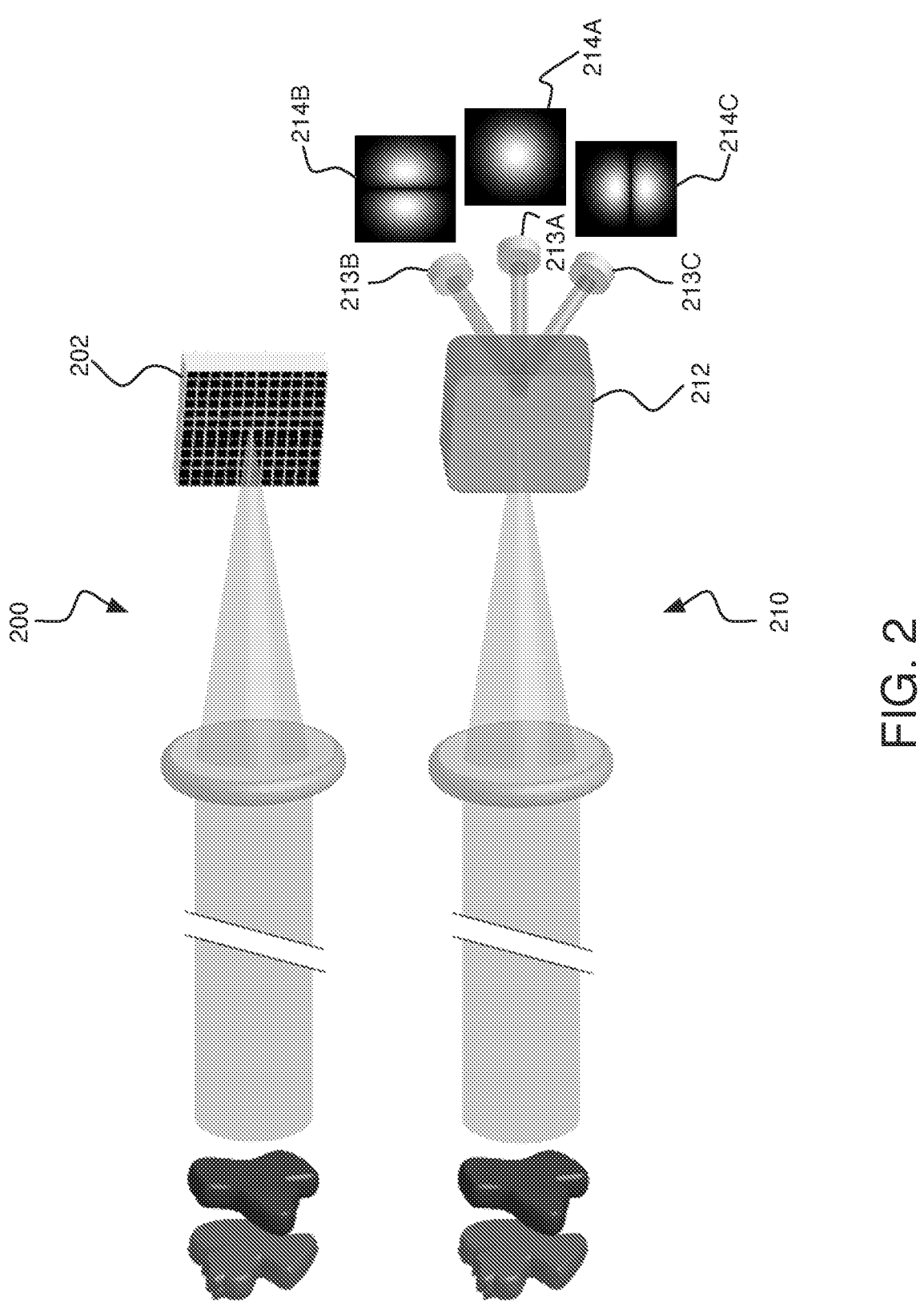
FIG. 2 is a schematic diagram illustrating direct imaging and spatial mode sorting.

FIG. 2 shows an example of a direct imaging system 200 that collects incoming light and images the light onto a detector 202. In contrast, a spatial mode sorting system 210 collects incoming light and a spatial mode sorter 212 projects it onto a first spatial mode 214A that is detected by a first detector 213A, a second spatial mode 214B that is detected by a second detector 213B, and a third spatial mode 214C that is detected by a third detector 213C.

Figure 3:
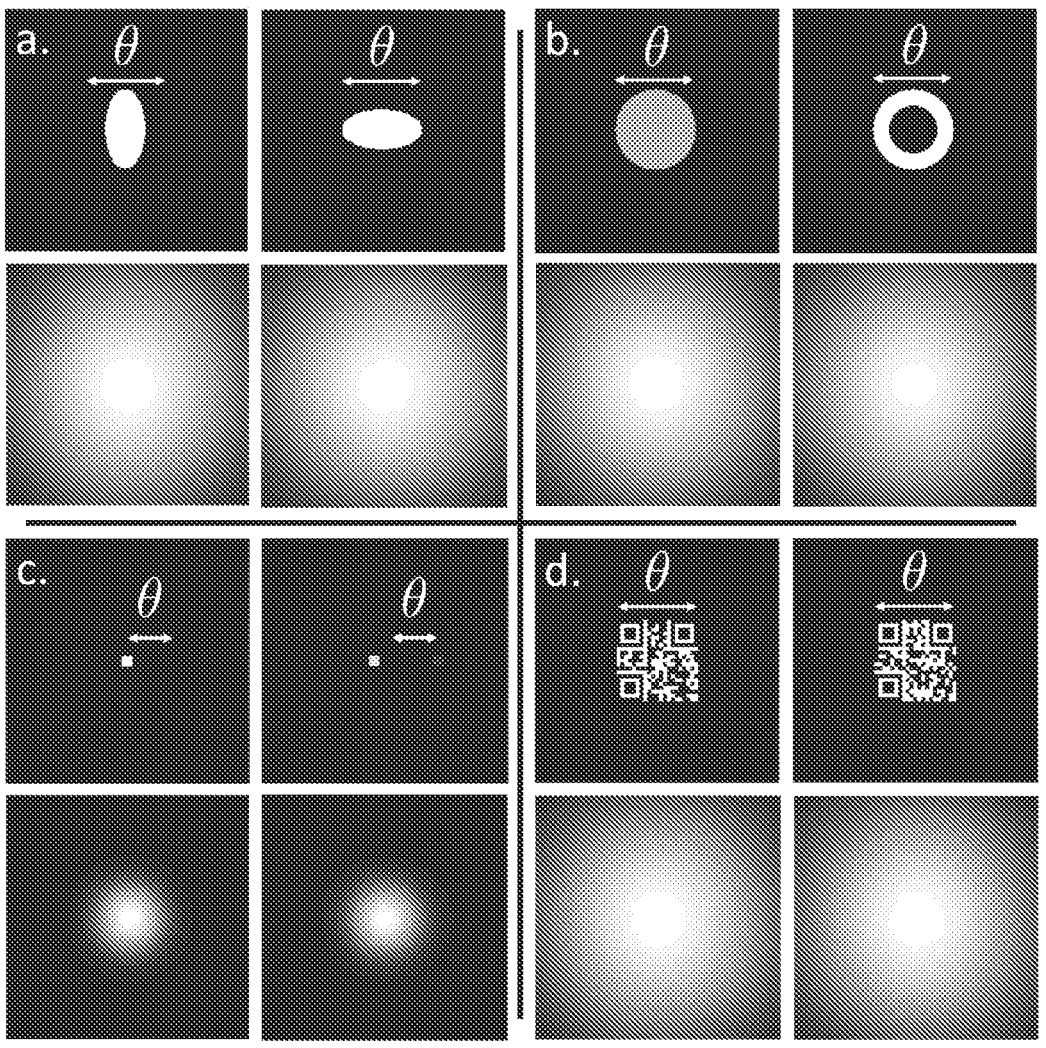
FIG. 3 is a set of images including subsets (a, b, c, d) of images corresponding to four pairs of objects imaged with direct imaging, before and after each image is convolved with a Gaussian point spread function.
Figure 4:
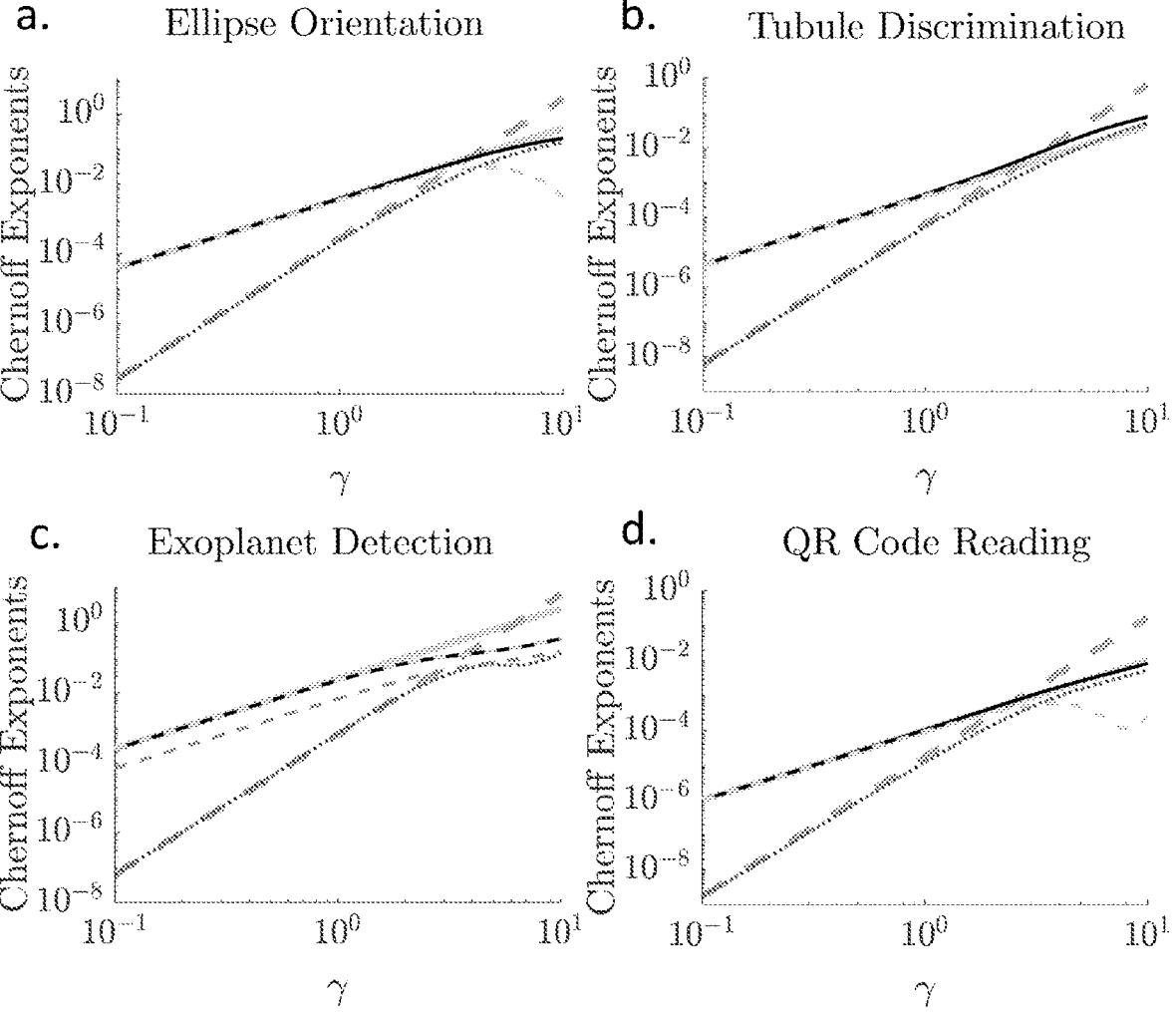
FIG. 4 is a set of four plots (a, b, c, d) comparing direct imaging and spatial mode sorting by plotting a scaling factor related to the success probability of object discrimination.

The upper two images of FIG. 3a show the object irradiance of a vertical and horizontal ellipse while the lower two images of FIG. 3a show their Gaussian point spread function convolved image-plane intensity profiles. The upper two images of FIG. 3b show the object irradiance of a filled and hollow pore while the lower two images of FIG. 3b show their Gaussian point spread function convolved image-plane intensity profiles. The upper two images of FIG. 3c show the object irradiance of two possible exoplanet detection scenarios while the lower two images of FIG. 3c show their Gaussian point spread function convolved image-plane intensity profiles. The upper two images of FIG. 3d show the object irradiance of two different QR codes while the lower two images of FIG. 3d show their Gaussian point spread function convolved image-plane intensity profiles.

To illustrate our results, in FIG. 4a, FIG. 4b, FIG. 4c, FIG. 4d we numerically evaluate $\xi_Q^{(1)}$, $\xi_{Direct}^{(1)}$, and $\xi_{TriSPADE}^{(1)}$ for the examples depicted in FIG. 3a, FIG. 3b, FIG. 3c, and FIG. 3d respectively. Thick lines represent the analytical lowest-order (in γ) results for $\xi_Q^{(1)}$ (solid) and $\xi_{Direct}^{(1)}$ (dashed). Thin lines represent numerical results for $\xi_Q^{(1)}$ (solid), $\xi_{Direct}^{(1)}$ (dotted), and $\xi_{TriSPADE}^{(1)}$ (dashed). A misalignment of θ/10 is used for the lower TriSPADE CE in FIG. 4c. The lowest-order behavior of the QCE in γ [Eq. (6)] is an excellent approximation for both the full QCE and the TriSPADE CE throughout the sub-Rayleigh regime (γ<1), and the results clearly exhibit the expected $O(\gamma^2)$ scaling gap. We also find TriSPADE to be robust to optical misalignment; a mode sorter that is misaligned from the mutual object centroid retains the quadratic scaling advantage over direct imaging. These results suggest that TriSPADE can perform a wide range of sub-Rayleigh hypothesis tests with substantially less error than conventional imaging methods.

We now extend our analysis to M>2 equiprobable objects, such as a database of QR codes. The M-ary QCE $\xi_{Q,M}^{(1)}=\min_{i\neq j}\xi_{Q,i,l}^{(1)}$, which characterizes the quantum-limited asymptotic error for discriminating M states, is found by minimizing the pairwise QCEs $\xi_{Q,i,j}^{(1)}$ for each pair of states $\{\rho_i, \rho_j\}$. The similarly defined M-ary CE $\xi_{Meas,M}^{(1)}$ $=\min_{i\neq j}\xi_{Meas,i,j}^{(1)}$ obeys the multiple quantum Chernoff bound $\xi_{Meas,M}^{(1)}\leq\xi_{Q,M}^{(1)}$. We have shown that $\xi_{TriSPADE,i,j}^{(1)}=\xi_{Q,i,j}^{(1)}$ for any two states when $\gamma\ll1$. Therefore, the TriSPADE POVM, which does not depend on the candidate states, will simultaneously achieve the QCE for all pairs of states in a database. It follows that $\xi_{TriSPADE,M}^{(1)}=\xi_{Q,M}^{(1)}$. We conclude that TriSPADE is a quantum-optimal measurement for any M-object database in the sub-Rayleigh limit.

Figure 5:
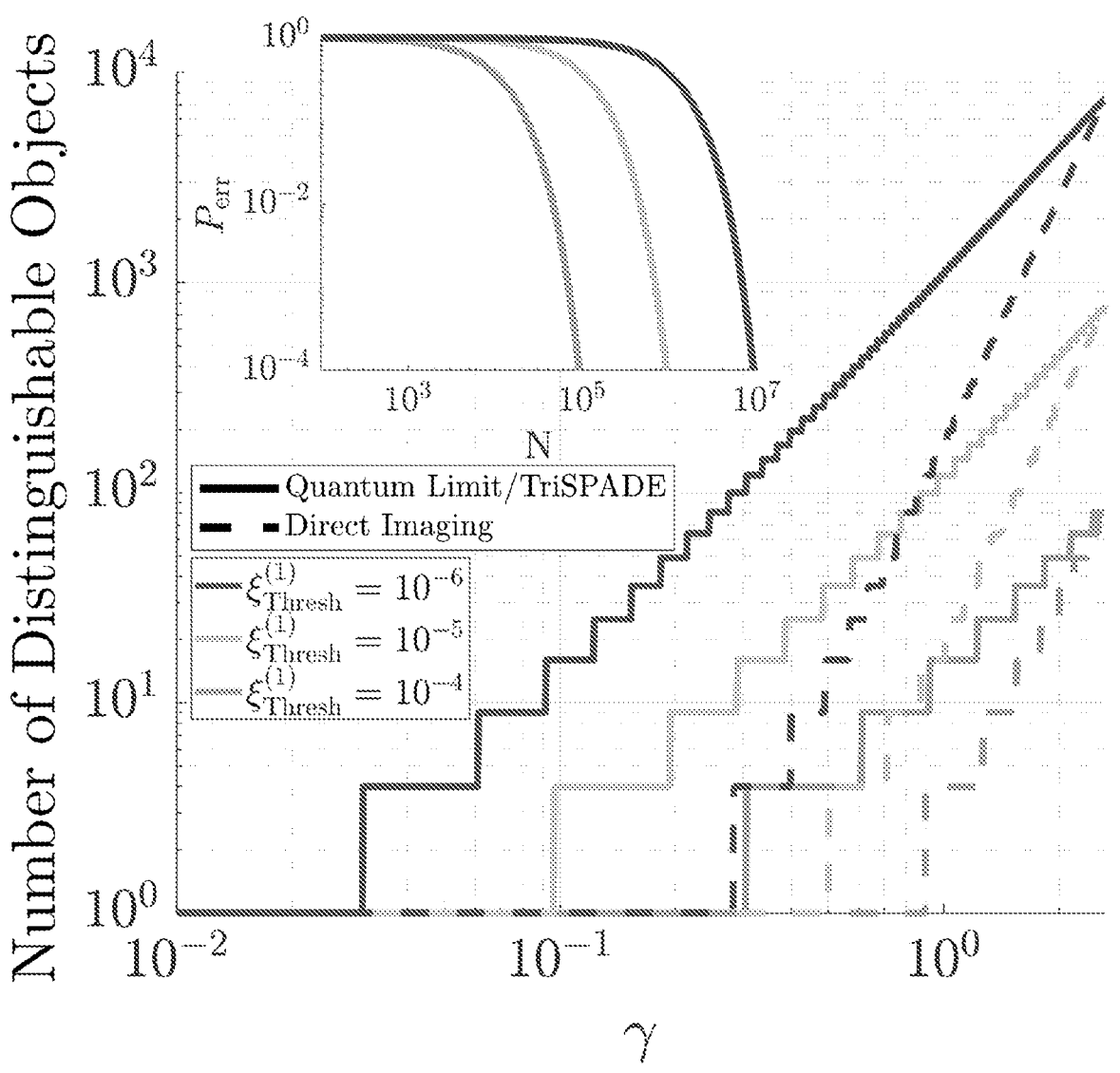
FIG. 5 is a plot showing the maximum number of objects that can be distinguished at a given threshold error rate with a 2D Gaussian aperture.

Finally, in FIG. 5 we show how many objects can be distinguished to a desired accuracy with a conventional or quantum-optimal measurement. The inset of FIG. 5 shows the error probability vs. mean detected photon number. We find that TriSPADE resolves more objects than direct imaging when $\gamma<\sqrt{2}/(\sqrt{m_{x^2,max}}+\sqrt{m_{x^2,min}})$ regardless of the threshold error rate $\xi_{Thresh}^{(1)}$. As the threshold is relaxed, meaning more photons are available and/or more error can be tolerated (inset), the gap between TriSPADE and direct imaging grows to over two orders of magnitude for small $\gamma$. We conclude that TriSPADE significantly increases the complexity of distinguishable sub-Rayleigh object databases without compromising performance.

The examples described herein show that a realizable optical receiver could substantially enhance decision-making accuracy for super-resolution biological, astronomical, and terrestrial imaging.

The spatial mode sorting may be performed with various optical configurations, as discussed below.

Figure 6A:
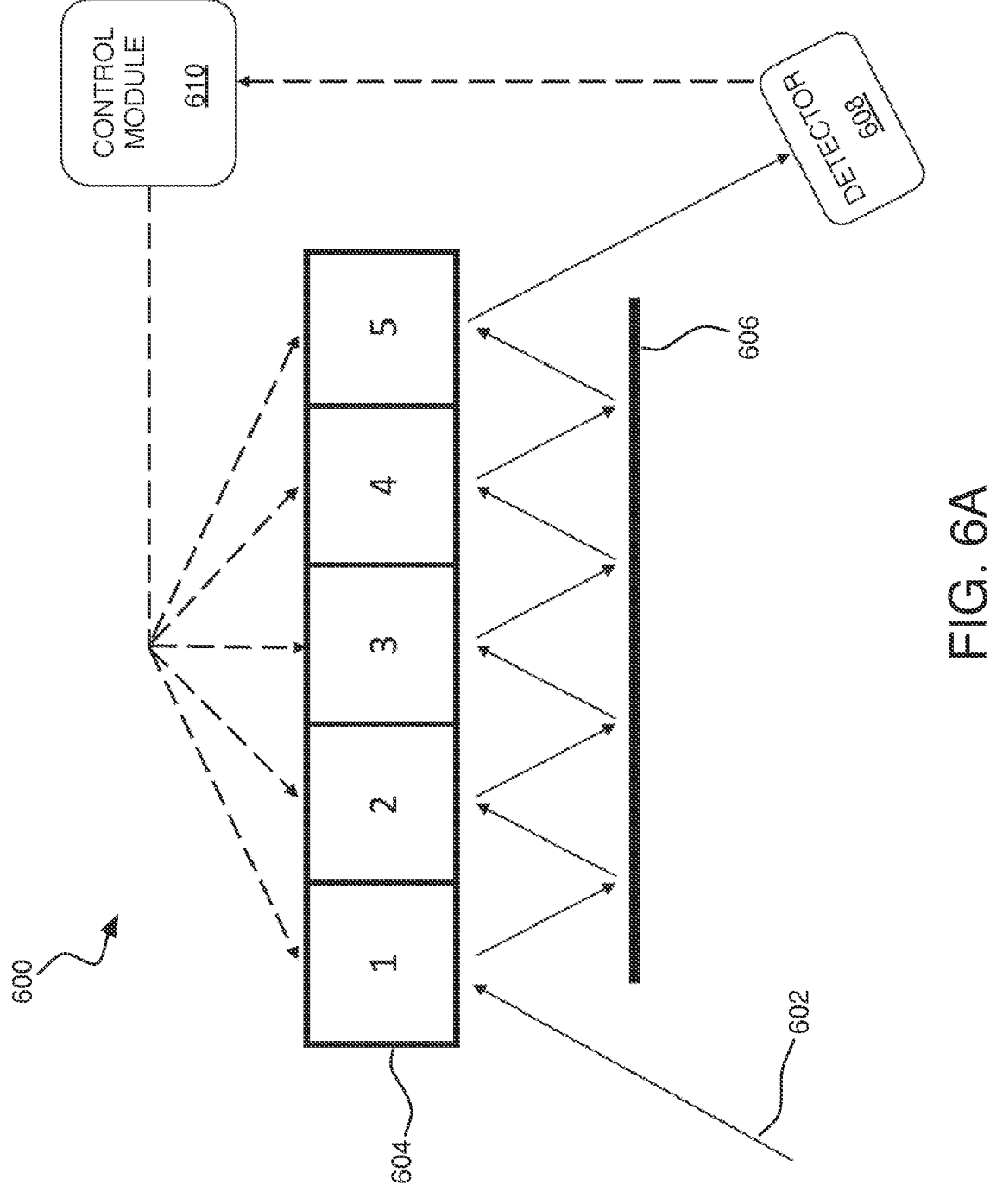
FIG. 6A is a schematic diagram of an implementation of a spatial mode sorter system.

FIG. 6A shows an example of a spatial mode sorting system 600. The incoming beam 602 reflects off a spatial light modulator 604 containing five independently controlled regions that modifies the intensity or phase of the incoming beam 602. A mirror 606 reflects the incoming beam 602 after it has interacted with one or more of the regions of the spatial light modulator 604. The incoming beam 602 is then sent to a detector 608, such as an EMCCD or CMOS camera. The information produced by the detector is then sent to a processor 610, such as an FPGA, which can then control the intensity and phase of future incoming light 602 after reflecting from the spatial light modulator 604.

Figure 6B:
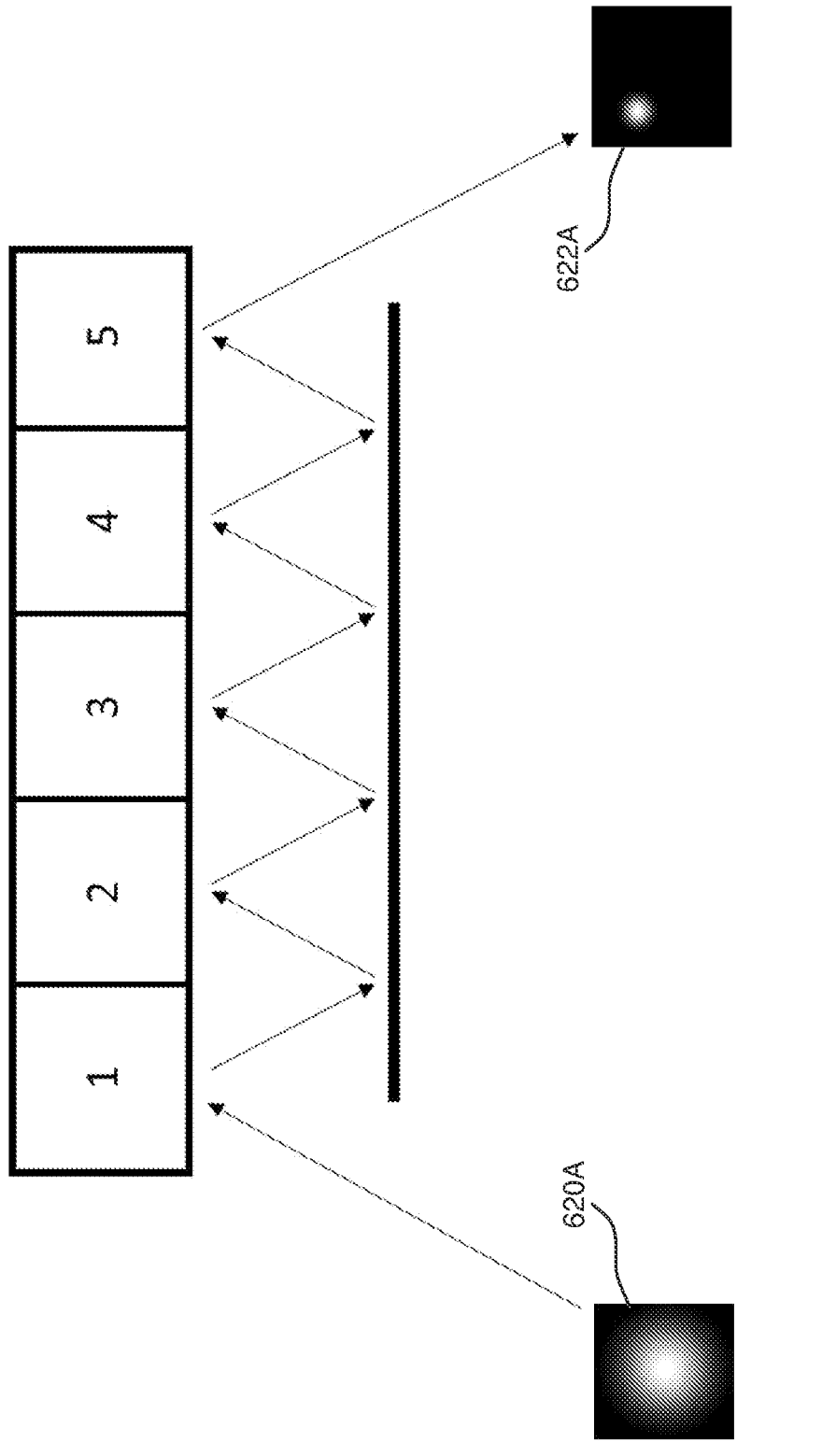
FIG. 6B is a schematic diagram illustrating the sorting of a first spatial mode.

FIG. 6B shows the spatial mode sorting system 600 with an incoming beam containing a first mode 620A and sorting it to a first region of the detector image 622A.

Figure 6C:
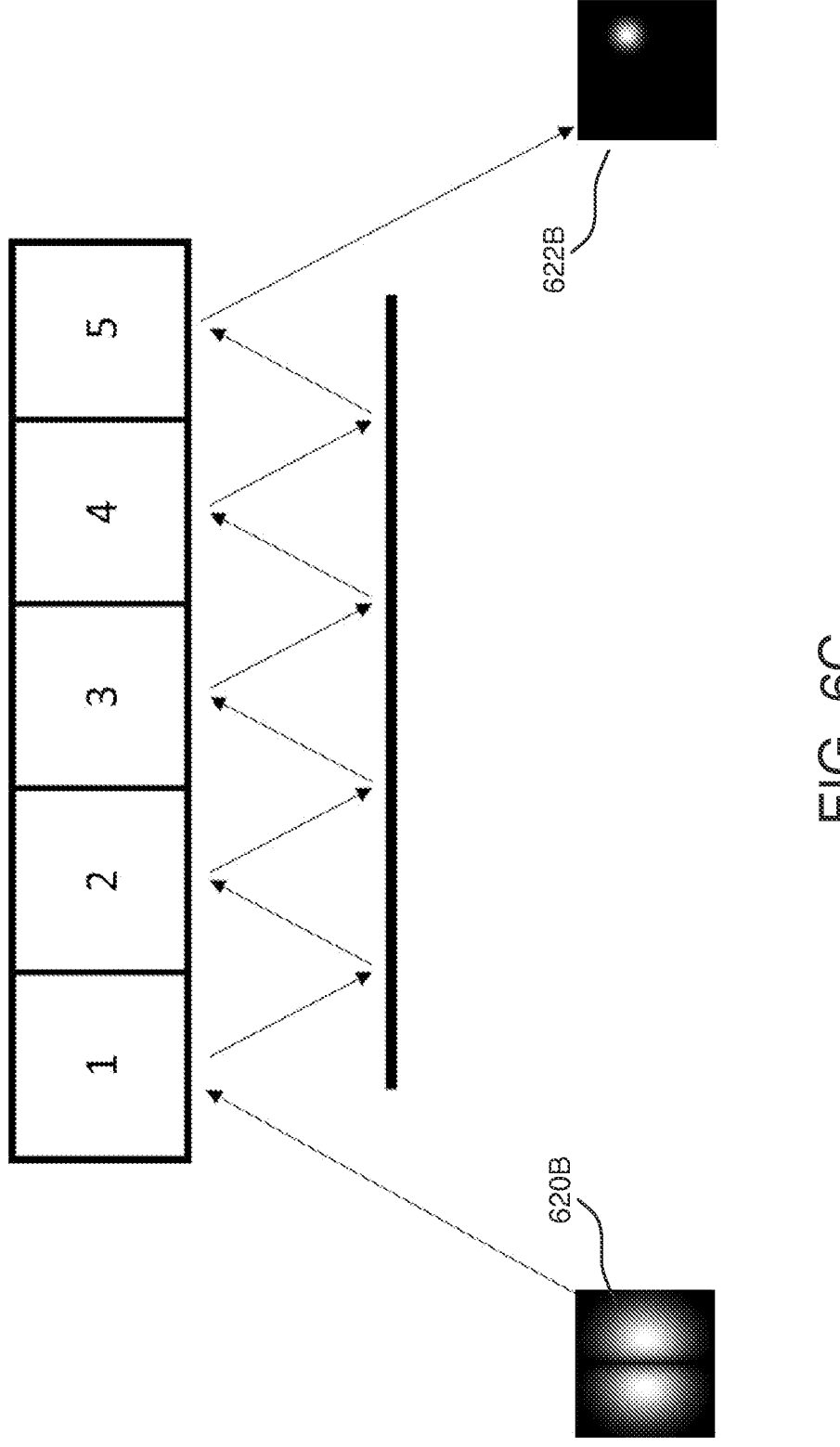
FIG. 6C is a schematic diagram illustrating the sorting of a second spatial mode.

FIG. 6C shows the spatial mode sorting system 600 with an incoming beam containing a second mode 620B and sorting it to a second region of the detector image 622B.

Figure 6D:
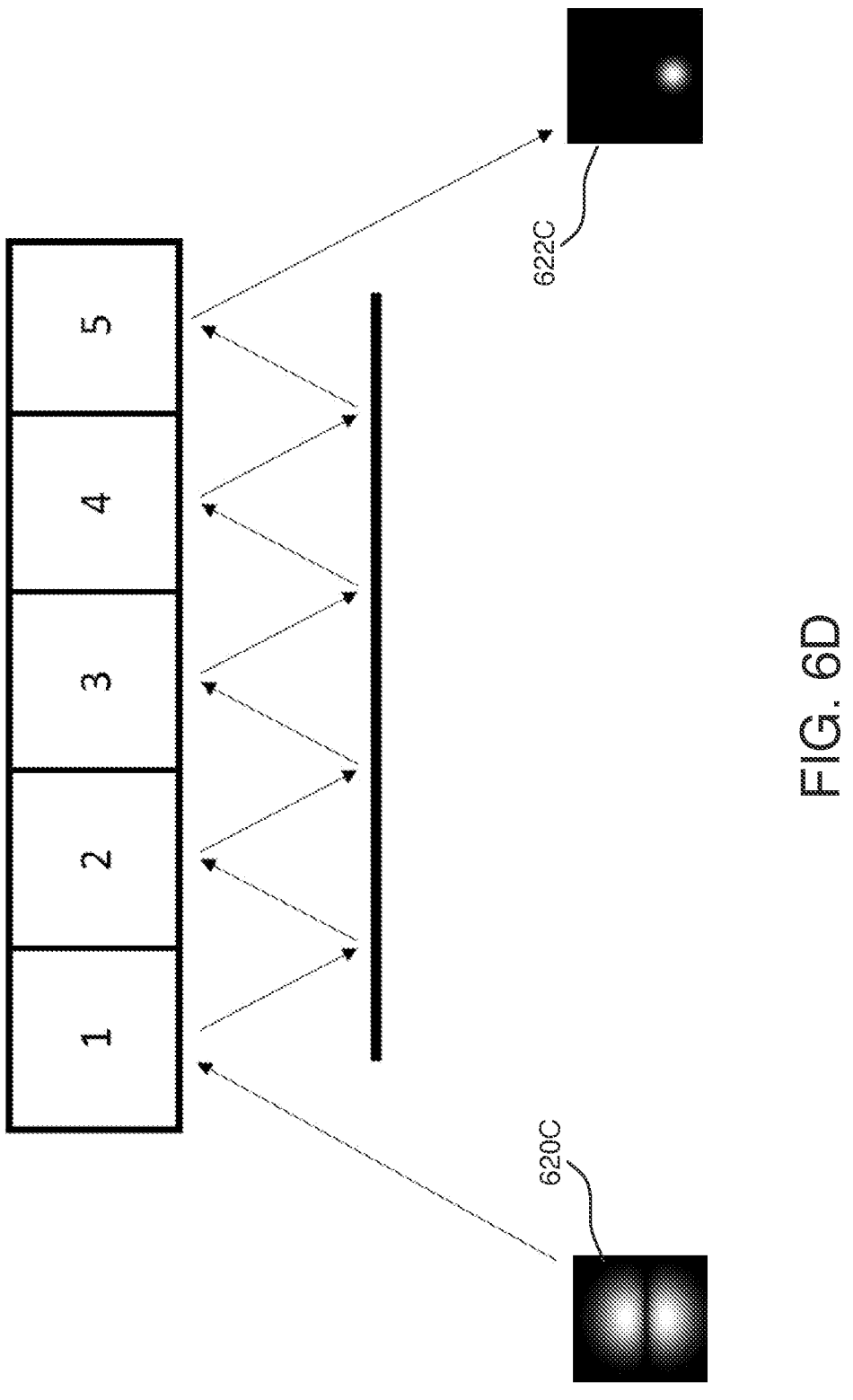
FIG. 6D is a schematic diagram illustrating the sorting of a third spatial mode.

FIG. 6D shows the spatial mode sorting system 600 with an incoming beam containing a first mode 620C and sorting it to a third region of the detector image 622C.

If a superposition of the modes 620A, 620B, and 620C is received in the beam 602, the ratio of the spot intensities on the resulting detector image can be used to infer the relative strength of the modes in the received beam 602.

Figure 7:
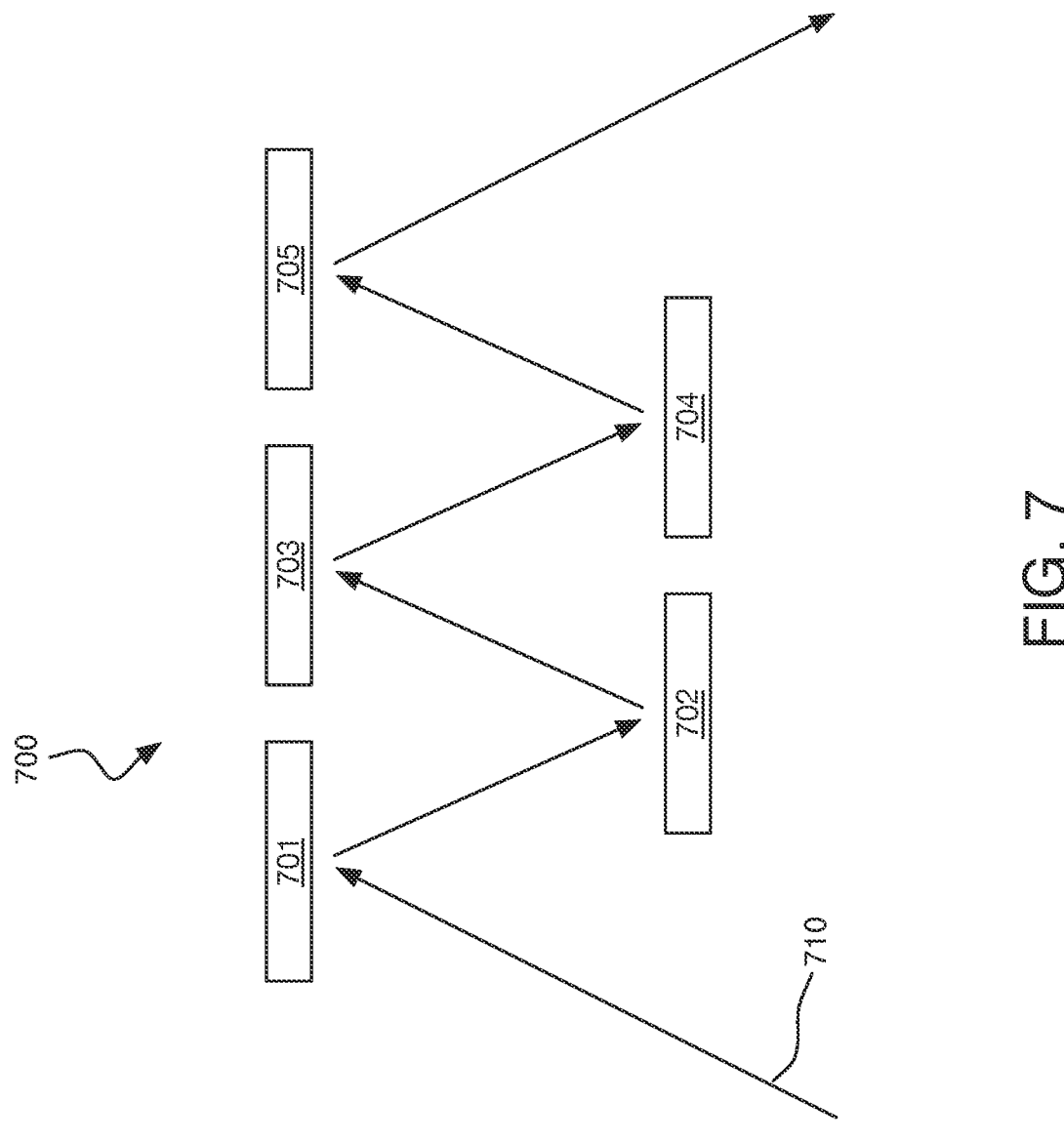
FIG. 7 is a schematic diagram of a second implementation of a spatial mode sorter.

FIG. 7 shows a second example of a spatial mode sorting system 700. A first spatial light modulator 701 reflects and modifies the intensity or phase of the incoming beam 710. A second spatial light modulator 702, a third spatial light modulator 703, a fourth spatial light modulator 704, and a fifth spatial light modulator 705 further reflect and modify the intensity or phase of the incoming beam 710.

Figure 8:
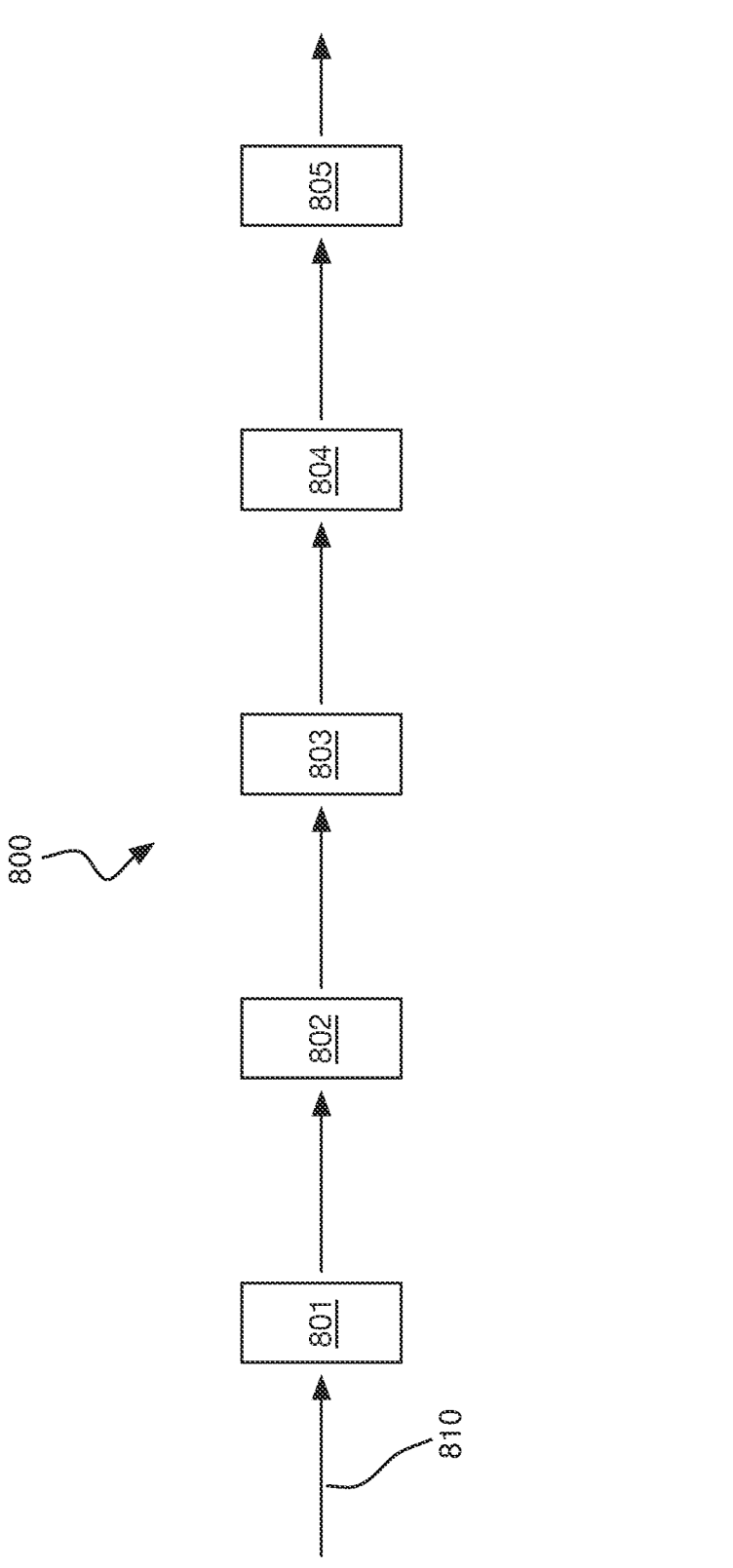
FIG. 8 is a schematic diagram of a third implementation of a spatial mode sorter.

FIG. 8 shows a third example of a spatial mode sorting system 800. A first spatial light modulator 801 transmits and modifies the intensity or phase of the incoming beam 810. A second spatial light modulator 802, a third spatial light modulator 803, a fourth spatial light modulator 804, and a fifth spatial light modulator 805 further transmit and modify the intensity or phase of the incoming beam 810.

Figure 9:
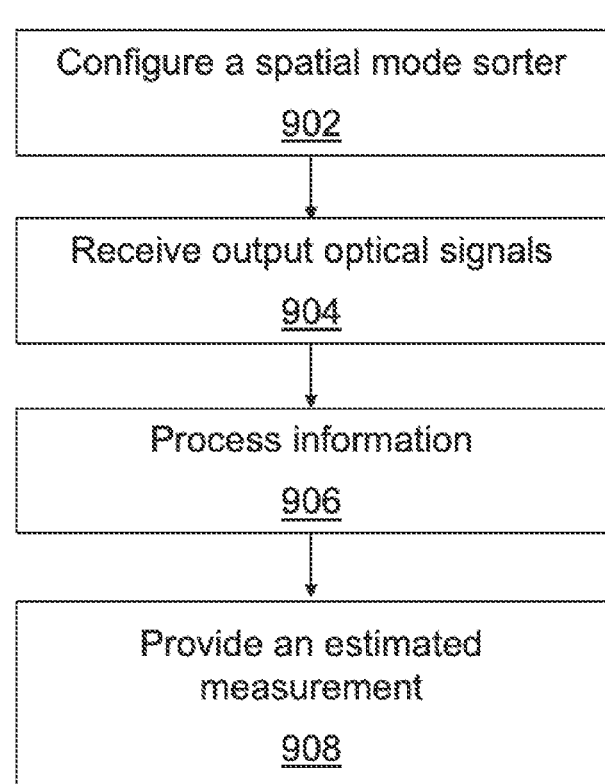
FIG. 9 shows a flowchart for an example spatial mode sorting procedure.

FIG. 9 shows a flowchart for an example spatial mode sorting procedure 900 for discriminating among a first set of predetermined target images. The procedure 900 includes configuring (902) a spatial mode sorter to provide, in response to receiving (904) an input optical signal, a separate output optical signal for each spatial mode in a set of target spatial modes. The procedure 900 includes processing (906) information based at least in part on the set of output optical signals received in the detection interval of time. The procedure 900 includes providing (908) an estimated measurement for discriminating among a first set of two or more predetermined target images based at least in part on information derived from the processing. The procedure 900 may be performed when, during the detection interval of time, a total number of the output optical signals is greater than two and less than ten. The procedure 900 may be iterated multiple times until a goal is reached (e.g., until no further imaging is allowed), with each iteration providing (908) an estimated measurement for discriminating among a first set of two or more predetermined target images. The procedure 900 may be iterated multiples times, providing (908) a plurality of estimated measurements for discriminating among a plurality of sets of two more predetermined target images.

The techniques described above for controlling and configuring a spatial mode sorting system can be implemented using software for execution on a computer system. For example, the software can define procedures in one or more computer programs that execute on one or more programmed or programmable computer systems (e.g., desktop, distributed, client/server computer systems) each including at least one processor, at least one data storage system (e.g., including volatile and non-volatile memory and/or storage elements), at least one input device (e.g., keyboard and mouse) or port, and at least one output device (e.g., monitor) or port. The software may form one or more modules of a larger program.

The software may be provided on a non-transitory medium such as a computer-readable storage medium (e.g., solid state memory or media, or magnetic or optical media) readable by a general or special purpose programmable computer system, or delivered over a communication medium (e.g., encoded in a propagated signal) such as network to a computer system where it is stored in a non-transitory medium and executed. Each such computer program can be used to configure and operate the computer system when the non-transitory medium is read by the computer system to perform the procedures of the software.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for optical imaging, the method comprising:
   configuring a spatial mode sorter to provide, in response to a received input optical signal, a separate output optical signal for each spatial mode in a set of target spatial modes;
   receiving a set of output optical signals from the spatial mode sorter during a detection interval of time;

processing information based at least in part on the set of output optical signals received in the detection interval of time; and providing an estimated measurement for discriminating among a first set of two or more predetermined target images based at least in part on information derived from the processing;

wherein during the detection interval of time, a total number of the output optical signals is greater than two and less than ten.

2. The method of claim 1, further comprising;

receiving a second set of output optical signals from the spatial mode sorter during a second detection interval of time;

processing information based at least in part on the second set of output optical signals received in the second detection interval of time; and providing a second estimated measurement for discriminating among the first set of two or more predetermined target images based at least in part on information derived from the processing.

3. The method of claim 1, further comprising;

receiving a second set of output optical signals from the spatial mode sorter during a second detection interval of time;

processing information based at least in part on the second set of output optical signals received in the second detection interval of time; and providing a second estimated measurement for discriminating among a second set of two or more predetermined target images based at least in part on information derived from the processing.

4. The method of claim 1, wherein the processing includes:

determining, based at least in part on the set of output optical signals, information that is dependent on a second moment of a transverse spatial distribution of the input optical signal; and performing a statistical analysis of the determined information based on a decision rule that provides a discrimination among the two or more predetermined target images.

5. The method of claim 4, wherein the determined information further comprises information that is dependent on a first moment of a spatial distribution of the input optical signal.

6. The method of claim 4, wherein the statistical analysis includes additional information obtained by prior measurement or prior estimation.

7. The method of claim 4, wherein the decision rule comprises a comparison between the determined information and a set of second moments containing transverse spatial distributions of each of the predetermined target images.

8. The method of claim 4, wherein the determined information is dependent on a third moment of a transverse spatial distribution of the input optical signal.

9. The method of claim 6, wherein the decision rule comprises a comparison between the determined information and a set of third moments containing transverse spatial distributions of each of the predetermined target images.

10. The method of claim 1, wherein the set of target spatial modes includes: a zero-order radially symmetric spatial mode, and two first-order spatial modes that represent transverse spatial distributions along orthogonal axes.

11. The method of claim 1, wherein a subset of the set of target spatial modes are Hermite-Gaussian modes.

12. The method of claim 1, wherein a subset of the set of target spatial modes are distorted Hermite-Gaussian modes.

13. The method of claim 1, wherein a subset of the set of target spatial modes are matched to the spatial mode of a point spread function of an imaging system.

14. The method of claim 1, wherein the set of target spatial modes is modified to compensate for misalignment of the spatial mode sorter with respect to the received input optical signal.

15. The method of claim 1, wherein the set of target spatial modes is modified to compensate for optical aberrations distorting the received input optical signal.

16. The method of claim 1, further comprising spatially aligning the spatial mode sorter to compensate for changes in a spatial or angular position of the received optical signal.

17. The method of claim 1, wherein the two or more predetermined target images represent images of different types of vehicles.

18. The method of claim 1, wherein the two or more predetermined target images represent images of different celestial bodies.

19. The method of claim 1, wherein the two or more predetermined target images represent images of different biological structures.

20. The method of claim 11, wherein the processing includes assigning classification labels to an input optical signal from a set of two or more predetermined classification labels.

21. One or more non-transitory computer-readable media, having instructions stored thereon that, when executed by a computer system, cause the computer system to perform operations comprising:

configuring a spatial mode sorter to provide, in response to a received input optical signal, a separate output optical signal for each spatial mode in a set of target spatial modes;

receiving a set of output optical signals from the spatial mode sorter during a detection interval of time;

processing information based at least in part on the set of output optical signals received in the detection interval of time; and providing an estimated measurement for discriminating among a first set of two or more predetermined target images based at least in part on information derived from the processing;

wherein during the detection interval of time, a total number of the output optical signals is greater than two and less than ten.

22. An apparatus for imaging a distribution of one or more optical sources, the apparatus comprising:

a spatial mode sorter that is configurable based on a set of target spatial modes onto which an input optical signal is projected; and a control module configured to:

configure the spatial mode sorter to provide, in response to a received input optical signal, a separate output optical signal for each spatial mode in the set of target spatial modes;

receive a set of output optical signals from the spatial mode sorter during a detection interval of time;

process information based at least in part on the set of output optical signals received in the detection interval of time; and provide an estimated measurement for discriminating among a first set of two or more predetermined target images based at least in part on information derived from the processing;

wherein during the detection interval of time, a total number of the output optical signals is greater than two and less than ten.

* * * * *